V. A. FYNN.
ALTERNATING CURRENT MOTOR.
APPLICATION FILED APR. 1, 1914.

1,152,622.

Patented Sept. 7, 1915.
2 SHEETS—SHEET 1.

WITNESSES:

INVENTOR
V. A. Fynn,
BY
ATTORNEY

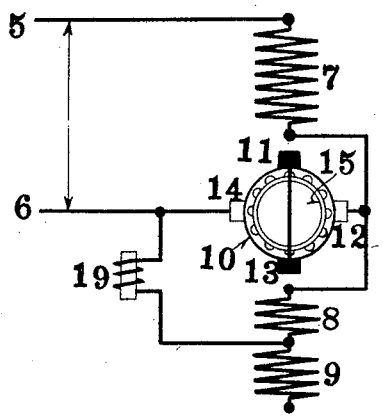
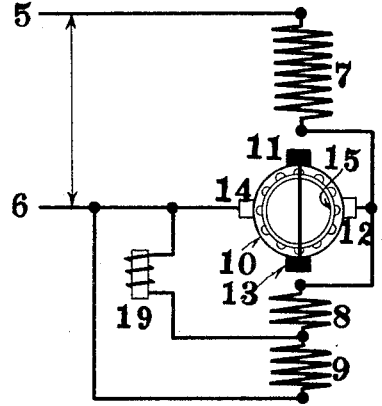
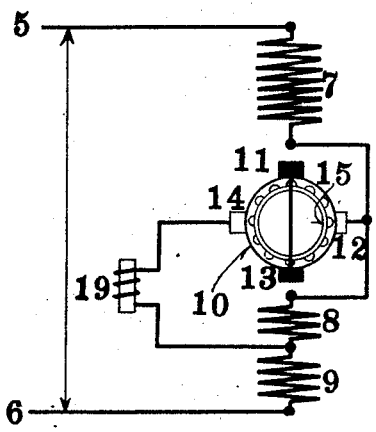
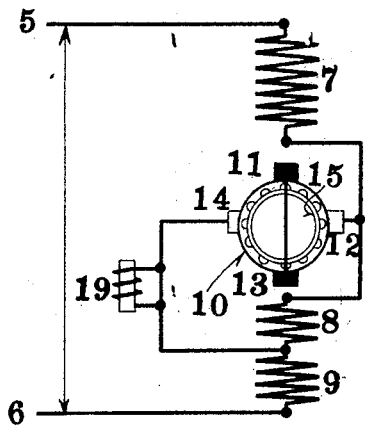
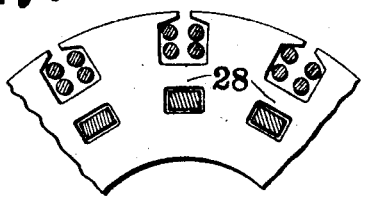

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,152,622.

Specification of Letters Patent.

Patented Sept. 7, 1915.

Application filed April 1, 1914. Serial No. 828,661.

*To all whom it may concern:*

Be it known that I, VALÈRE ALFRED FYNN, a subject of the King of England, residing at the city of St. Louis, State of Missouri, have invented a certain new and useful Alternating-Current Motor, of which the following is such a full, clear, and exact description as will enable any one skilled in the art to which it appertains to make and use the same, reference being had to the accompanying drawings, forming part of this specification.

My invention more particularly relates to alternate current motors of the single-phase type compensated for power factor, and its object is to limit the no-load speed of such machines without necessitating any change in connections.

I will describe my invention with special reference to a single-phase alternate current commutator motor provided with a squirrel-cage located below the commuted winding and separated therefrom by a bridge of magnetic material.

Figure 1:
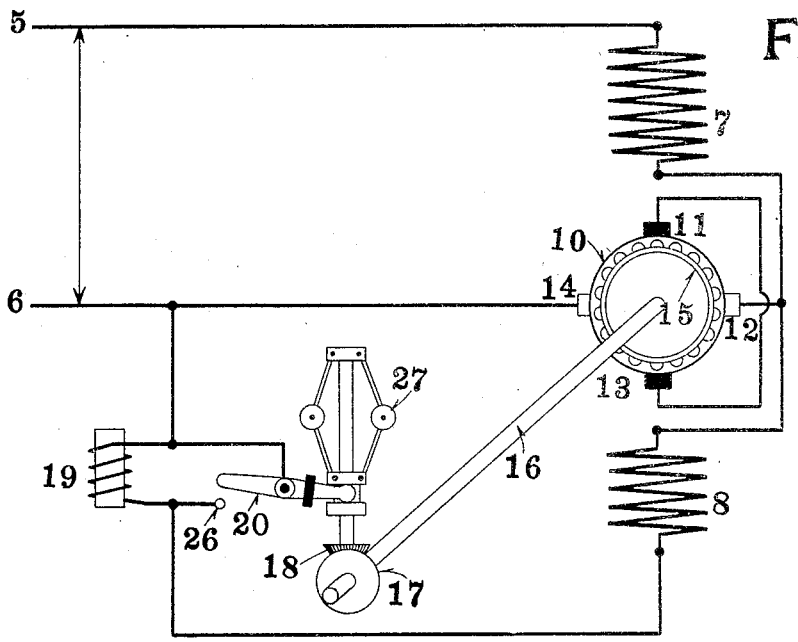
Figure 2:
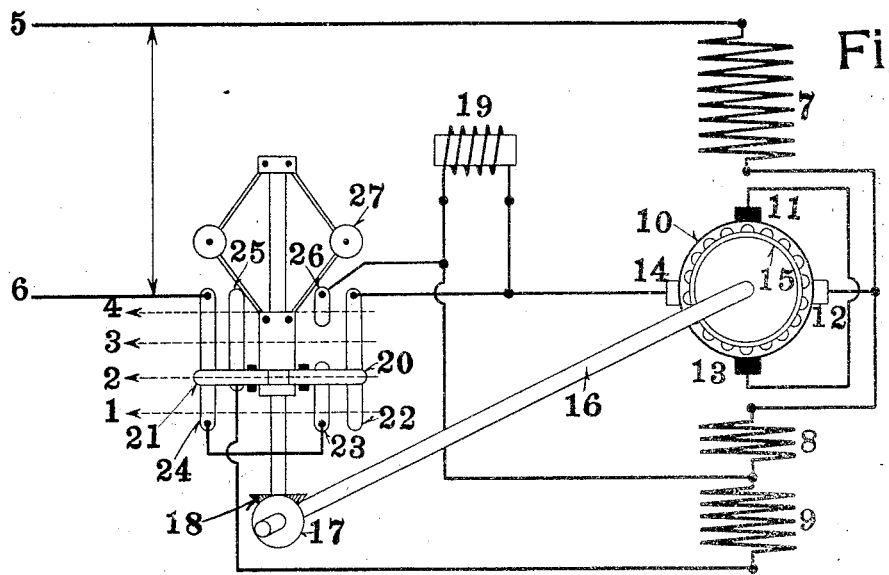

In the accompanying drawings, which represent 2-pole motors of the type referred to and embodying my invention, Figure 1 shows a machine in which the number of active stator turns at starting is the same as in normal operation. Fig. 2 shows a machine in which the number of stator turns in normal operation is greater than at starting, and Figs. 3, 4, 5 and 6 indicate the four different motor connections established by the automatic switch in Fig. 2. Fig. 7 is a view showing a portion of the rotor of the machine with the conductors in section.

Referring to Fig. 1, the rotor carries a commuted winding 10, with which coöperate short-circuited working brushes 11, 13 and exciting brushes 12, 14, displaced by 90 electrical degrees with respect to the working brushes. The rotor also carries a squirrel-cage 15, preferably located underneath the commuted winding 10 and separated therefrom by magnetic material 28. The stator carries a main winding 7 and a compensating winding 8 coaxial with the main winding and with the working brushes on the rotor. This compensating winding is permanently connected to the exciting brushes through the inductance 19. A switch 20, actuated by a centrifugal device 27 driven from the shaft 16 of the motor through the gear wheels 17, 18, is adapted to short-circuit the inductance 19 after the motor has reached a certain speed. The exciting brush 12, which is in direct connection with the compensating winding 8, is also connected to one end of the main stator winding 7, the other end of which is connected to the main 5. The main 6 is connected to the other exciting brush 14. Assuming the inductance 19 to be removed from the compensating circuit, the latter thus being interrupted at the point 26 as long as switch 20 remains open, the motor will start with a powerful torque, as is now well understood, and may or may not exceed its synchronous speed in case switch 20 is not closed. Whether this synchronous speed is exceeded or not mainly depends on the dimensions of the magnetic bridge 28 located between the squirrel-cage 15 and the commuted winding 10, on the proportions of the squirrel-cage itself, and on the ratio of rotor turns to stator turns. When the proportions are so chosen that the motor will develop, at starting, a torque which is about equal to or exceeds twice the normal, then the machine is liable to exceed its synchronous speed when running light with switch 20 open. Whether it exceeds said synchronous speed or not, it will not be compensated unless switch 20 is closed, automatically or by hand. Now, I have discovered that, by including in the compensating circuit the inductance 19 and properly selecting its value, it is possible to design the motor for any desired value of the starting torque within the limits of the machine and yet to prevent same from exceeding the synchronous speed, even if switch 20 is not closed. A further advantage of my invention is that the machine becomes compensated on reaching its full speed, whether switch 20 is closed or not. When the inductance 19 is included in the compensating circuit, as shown in Fig. 1, then it is only necessary to connect the motor to the mains when it will start with the torque for which it was designed, reach a speed in the neighborhood of the synchronous, and retain that speed regardless of the operation of switch 20. I prefer to arrange the centrifugal device 27 so that the switch 20 will short-circuit the inductance 19 when the motor reaches the neighborhood of synchronism. The main effect of short-circuiting this inductance is to increase the compensating effect. In selecting the value of the inductance 19, it should be remembered that for a given motor, the starting torque will be the greater the higher the value of this inductance, and the speed limiting effect will be the more positive, the lower the said value.

Fig. 2 shows an arrangement designed to reduce the magnetic densities in the motor after the normal working speed has been reached. To this end, a stator winding 9 is added, is coaxially disposed with the windings 7 and 8, and is placed in circuit by the centrifugal device 27 after a sufficient speed has been reached. At starting, the switch blades 21 and 20 controlled by the centrifugal device 27, are in the position 1, whereby the connections shown in Fig. 3 are established. These connections are identical with those disclosed in Fig. 1, as long as switch 20 thereof is not closed. As the centrifugal switch 27 moves into its position 2, the free end of the stator winding is connected to the main 6, as shown in Fig. 4, thus reducing the densities in the motor. In position 3 of the automatic switch, direct connection between the main 6 and the exciting brush 14 is interrupted, changing the diagram of connections to that shown in Fig. 5. In the last position, 4, of the automatic switch 27, the inductance 19 is short-circuited, as shown in Fig. 6.

While I have obtained the best results with an inductance or positive reactance, yet the no-load speed can also be limited with the help of an ohmic resistance although the starting torque will be reduced somewhat more and the compensating effect will not be so good as when an inductance is used. Generally speaking, I can achieve my object by permanently closing the compensating circuit over an impedance Z, it being understood that $$Z = \sqrt{r^2 + x^2}$$

where $r$ represents the ohmic resistance and $x$ the positive or negative reactance of the impedance.

Having fully described my invention, what I claim as new and desire to secure by Letters-Patent of the United States is:—

1. In an alternating current motor, the combination with an inducing member, of an induced member provided with a commuted winding and a second winding closed on itself, a magnetic shunt forming a pathway for magnetic flux to link with the commuted winding without linking with said second winding, exciting brushes and short-circuited working brushes coöperating with the commuted winding, and an impedance in circuit with the exciting brushes.

2. In an alternating current motor, the combination with an inducing member, of an induced member provided with a commuted winding and a second winding closed on itself, a magnetic shunt forming a pathway for magnetic flux to link with the commuted winding without linking with said second winding, exciting brushes and short-circuited working brushes coöperating with the commuted winding, and an inductance in circuit with the exciting brushes, and means governed by the speed of the motor for short-circuiting the inductance.

3. In an alternating current motor, the combination with an inducing member having a main inducing winding and a compensating winding, of an induced member provided with a commuted winding and a second winding closed on itself, a magnetic shunt forming a pathway for magnetic flux to link with the commuted winding without linking with said second winding, exciting brushes and short-circuited working brushes coöperating with the commuted winding, and an inductance connected to the exciting brushes in series with the compensating winding.

4. In an alternating current motor, the combination with a source of alternating E. M. F., of an inducing member having a main inducing winding and a compensating winding, an induced member provided with a commuted winding and a second winding closed on itself, a magnetic shunt forming a pathway for magnetic flux to link with the commuted winding without linking with said second winding, exciting brushes and short-circuited working brushes coöperating with the commuted winding, said exciting brushes being connected to the source in series with the main inducing winding at starting, and an inductance connected to the exciting brushes in series with the compensating winding.

In testimony whereof, I have hereunto set my hand and affixed my seal in the presence of the two subscribing witnesses.

VALÈRE A. FYNN. [L. S.]

Witnesses:
W. A. ALEXANDER,
G. M. SHORE.